(12) United States Patent
Erickson et al.

(10) Patent No.: US 7,967,659 B2
(45) Date of Patent: Jun. 28, 2011

(54) METHOD OF MACHINING INTEGRAL BLADED ROTORS FOR A GAS TURBINE ENGINE

(75) Inventors: Robert E. Erickson, Storrs, CT (US); Paul R. Faughnan, Jr., East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 492 days.

(21) Appl. No.: 12/120,786

(22) Filed: May 15, 2008

(65) Prior Publication Data

US 2009/0285647 A1    Nov. 19, 2009

(51) Int. Cl.
*B24B 49/00* (2006.01)
(52) U.S. Cl. ............................................. 451/5; 451/58
(58) Field of Classification Search .................. 451/5, 8, 451/11, 28, 57, 58
See application file for complete search history.

(56) References Cited

U.S. PATENT DOCUMENTS

| | | | |
|---|---|---|---|
| 2,962,941 A * | 12/1960 | Stein et al. ..................... 409/122 |
| 3,811,163 A | 5/1974 | Frederick et al. |
| 4,260,304 A | 4/1981 | Jacobi |
| 4,985,992 A | 1/1991 | Vosgien |
| 6,077,002 A | 6/2000 | Lowe |
| 6,764,384 B1 | 7/2004 | Kleer et al. |
| 6,869,259 B2 * | 3/2005 | Lebkuechner ................ 409/132 |
| 6,905,312 B2 * | 6/2005 | Bourgy et al. ................ 416/234 |
| 6,991,434 B2 | 1/2006 | Heinrich et al. |
| 7,107,886 B2 | 9/2006 | Hill et al. |
| 7,112,017 B2 | 9/2006 | Killer et al. |
| 7,207,869 B2 | 4/2007 | James |
| 7,225,539 B2 | 6/2007 | Nowak et al. |
| 7,303,461 B1 * | 12/2007 | Campomanes et al. ........ 451/28 |

* cited by examiner

*Primary Examiner* — Robert Rose
(74) *Attorney, Agent, or Firm* — Carlson, Gaskey & Olds PC

(57) ABSTRACT

A method of manufacturing an integral bladed rotor is disclosed. The method includes calculating a cutting path in an area of a blank between adjacent blade locations to approximate contours of adjacent blades. A cutter is plunged into the area at an initial angle and depth that extends from an outer perimeter to the blank to an inner perimeter of the blank, in one example. The blade roots extend from the inner perimeter, and the blade tips terminate near the outer perimeter. The cutter is plunged into the area at an original angle that, in one example, is different than the initial angle. The cutter is rotated about an axis in a spiral-like fashion as the cutter extends further into the blank, along the cutting path.

15 Claims, 3 Drawing Sheets

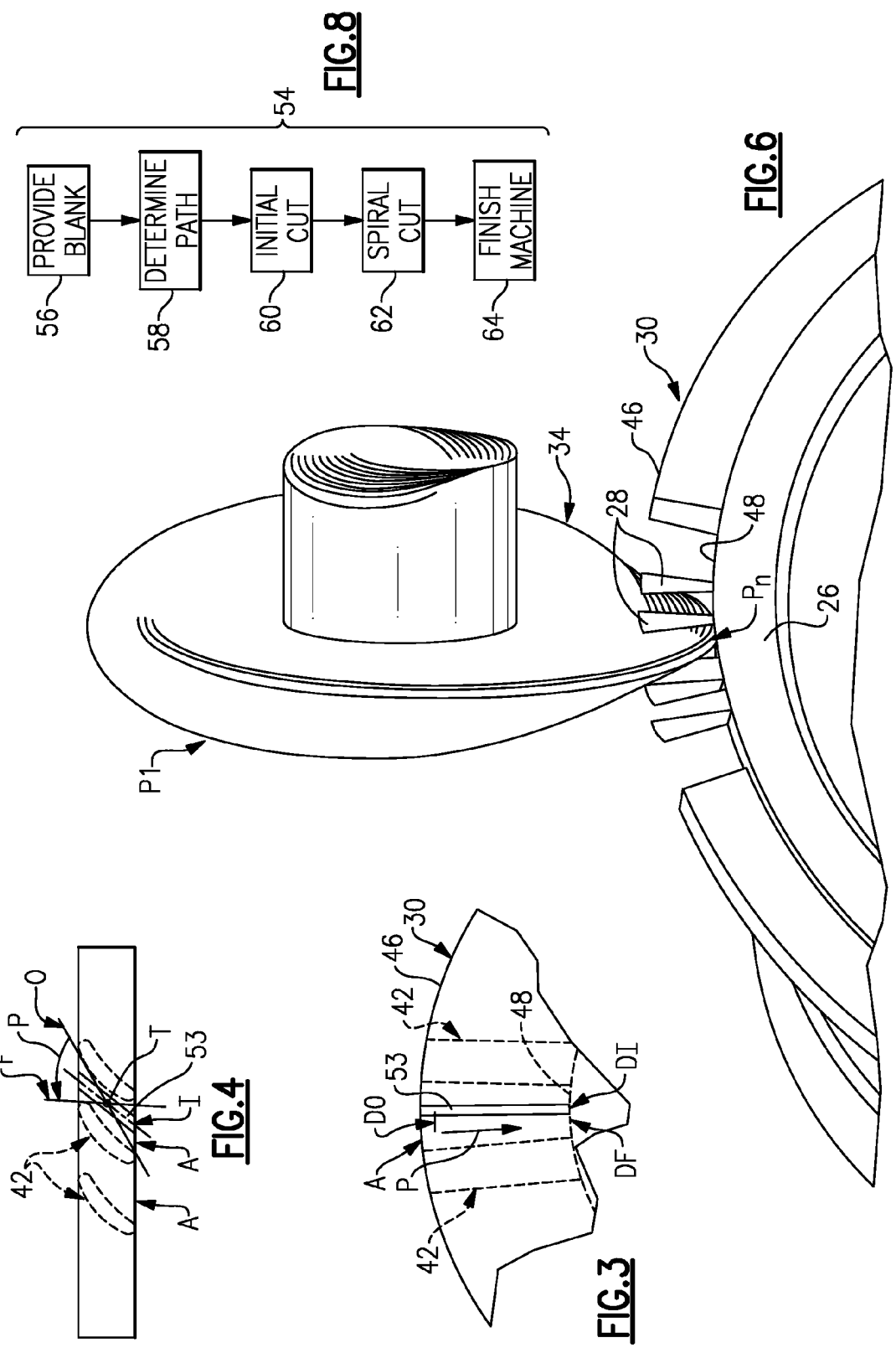

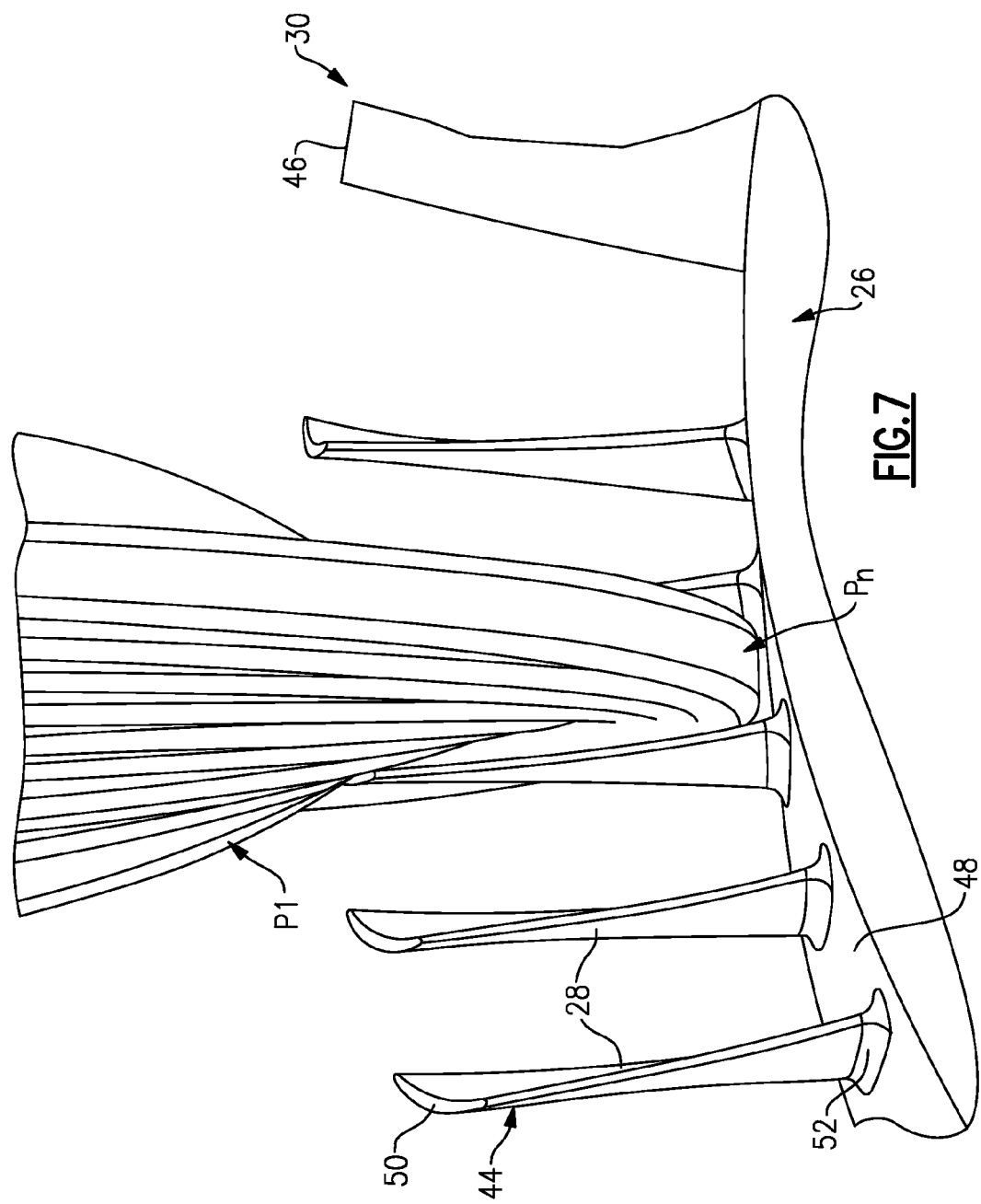

METHOD OF MACHINING INTEGRAL BLADED ROTORS FOR A GAS TURBINE ENGINE

This invention was made with government support under Contract Nos. N00019-02-C-3003 and ME.1061-01-03-19-000-SAM awarded by the United States Navy and the United States Air Force, respectively. The government therefore has certain rights in this invention.

BACKGROUND OF THE INVENTION

This disclosure relates to a method of manufacturing integral bladed rotors for a gas turbine engine.

Gas turbine engines include a turbine rotor mounted on a shaft. The rotor includes multiple turbine blades supported on its periphery. In one type of arrangement, each blade is separately secured to the rotor. In another type of arrangement, the blades are integral with the rotor. The turbine blades and rotor are machined from a blank, which is constructed from a nickel material, for example.

A significant amount of material is machined from the blank to provide the numerous blades when manufacturing integral bladed rotors. One machining approach employs a super abrasive machining method, which uses a cubic boron nitride cutting disc. The cutting disc, or cutter, is used to cut a slot between the locations at which the blades will be provided on the blank extending from an outer perimeter of the blank to an inner perimeter of the blank. Next, a smaller abrasive cutter is used in the initial slot to provide a rough approximation of the blade contours. The smaller cutters are used to produce discreet cuts in the blank. The smaller cutter is fragile and difficult to cool. Subsequent to using the smaller cutter, a semi-finish cutter and then a finish cutter are used to provide the final blade contours.

The rough cutting process used to provide the rough blade contours is long, labor intensive and costly. Generally, multiple tool changes are required when the small cutter breaks. What is needed is a faster, more reliable and less expensive machining method to provide the rough blade contours.

SUMMARY OF THE INVENTION

A method of manufacturing an integral bladed rotor is disclosed. The method includes calculating a cutting path in an area of a blank between adjacent blade locations to approximate contours of adjacent blades. A cutter is plunged into the area at an initial angle and depth that extends from an outer perimeter to the blank to an inner perimeter of the blank, in one example. The blade roots extend from the inner perimeter, and the blade tips terminate near the outer perimeter.

The cutter is plunged into the area at an original angle that, in one example, is different that the initial angle. The cutter is rotated about an axis in a spiral-like fashion as the cutter extends further into the blank, along the cutting path. In this manner, the need for using a smaller cutter is eliminated as the more robust larger cutter can be used to approximate the contours of the adjacent blades.

These and other features of the application can be best understood from the following specification and drawings, the following of which is a brief description.

BRIEF DESCRIPTION OF THE DRAWINGS

FIG. 3 is a schematic side elevational view of a blank according to an example machining process.

FIG. 4 is a top elevational view of the blank according to the example machining process.

FIG. 6 is a side perspective view of the cutter in the various positions along the cutting path.

FIG. 7 is an enlarged side perspective view of the cutter in the various positions.

FIG. 8 is a flow chart depicting the example machining process.

DETAILED DESCRIPTION OF THE PREFERRED EMBODIMENT

Figure 1:
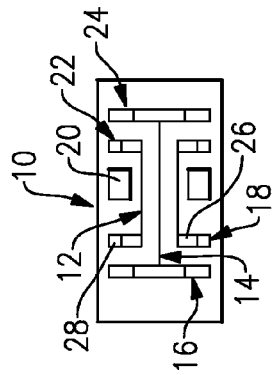
FIG. 1 is a highly schematic view of an example gas turbine engine.

An example gas turbine engine 10 is shown in FIG. 1. The engine 10 includes a low spool 14 that supports a low pressure compressor 16 and a low pressure turbine 24. A high spool 12 supports a high pressure compressor 18 and a high pressure turbine 22. A combustor 20 is arranged between the compressor section of the engine and the turbine section. Compressed air from the compressors 16, 18 mixes with fuel from the combustor 20 and is expanded in the turbines 22, 24, as is known in the art.

The high pressure compressor 18 includes a rotor 26 that supports multiple blades 28 about its periphery. The high pressure compressor 18 is fabricated from nickel. One or more stages of the high pressure compressor 18 may use an integral bladed rotor in which the blades are integrally formed from the same structure as the rotor 26 and, thus, can benefit from the disclosed machining method. The low pressure compressor 16 can also utilize the machining process of this disclosure, which is described below. The low pressure compressor 16 may be fabricated from titanium. It should be appreciated by a person of ordinary skill in the art that may be fabricated from other types of materials such as, but not limited to, nickel.

Figure 5:
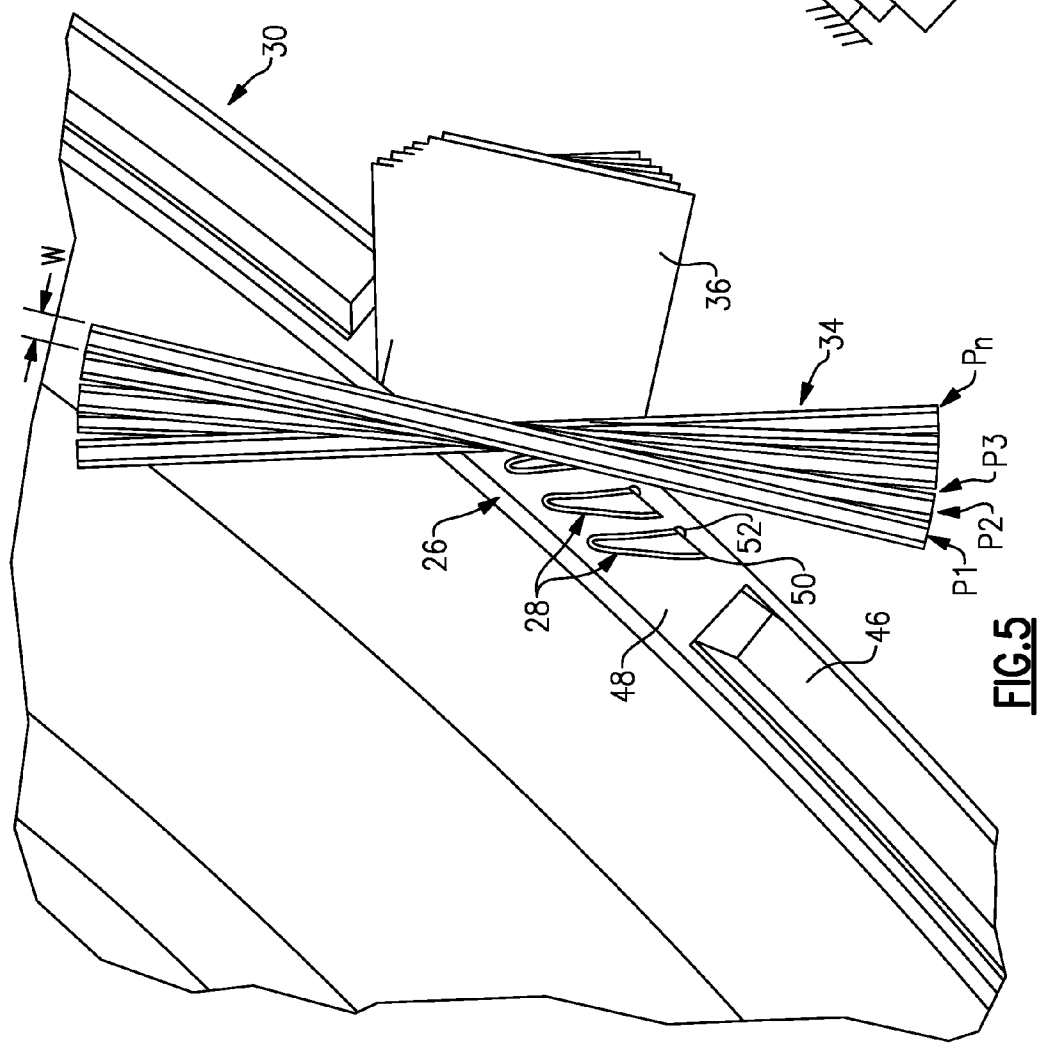
FIG. 5 is a top perspective view illustrating various cutter positions along a cutting path.

Although the disclosed machining method is described with respect to integral bladed compressor rotors, it should be appreciated that the disclosed machining method may also be used to form integral bladed turbine rotors. An example machining operation 29 is illustrated schematically in FIG. 2. A blank 30 is fabricated from, for example, a nickel material. The blank 30 provides both the rotor 26 and blades 28, as illustrated in FIGS. 5-7. The blades 28 are provided by machining the blank 30 in one or more steps to remove blank material. The blank 30 is held in a fixture 32 relative to a tool, such as a super abrasive cutter 34, which is mounted to a shaft 36. In one example, the cutter 34 is constructed of a metal core with an outer layer of cubic boron nitride material. In one example, the cutter 34 is a ten inch (250 mm) diameter disc having a half inch (13 mm) width W, for example. The cutter 34 is driven by a machine 38, which may be a multi-axis mill, for example, that is capable of moving the cutter 34 relative to the blank 30 in a desired cutting path P (i.e. P1, P2 ... $P_n$). The machine 38 includes a program and/or memory 40 that provides information to the machine 38 regarding the cutting path P, cutting speeds and other information, for example.

Referring to FIGS. 3 and 4, blade locations 42 are indicated in phantom on the blank 30. Material from an area A is removed by the cutter 34 between the adjacent blade locations 42 to approximate contours of adjacent blades 28 (FIGS. 5-7). In one example, the cutter 34 is plunged into the area A at an initial depth DI and at an initial angle I, which creates an initial slot 53. The initial slot 53 extends from an outer perimeter 46 to an inner perimeter 48. A root 52 of the blade 28 lies at or near the inner perimeter 48. The blade 28 extends to a tip 50, which is at or near the outer perimeter 46. Providing the initial slot 53 helps to facilitate a subsequent spiral cut that is less likely to damage the cutter 34, which is discussed below.

Figure 2:
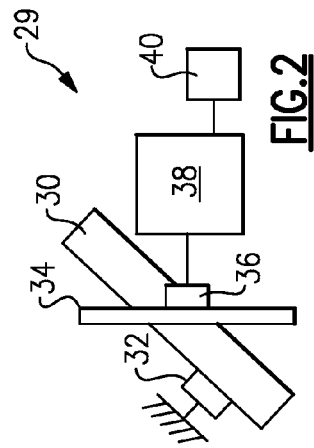
FIG. 2 is a schematic view of an example machining operation.

A cutting path P is calculated for the given blade geometry and spacing. The cutting path P is stored in a memory 40 or provided as a program, as indicated in FIG. 2. The cutting path P maximizes the amount of material removal with the cutter 34, in one example. The cutter 34 is extracted from the initial cut 53 and plunged into the area A at an original angle O. In the example shown, the original angle O is at or near the outer perimeter 46. As can be appreciated from FIG. 5, the tips 50 of the blades 28 are at a greater angle relative to the rotational axis X (FIG. 4) of the rotor 26 than are the roots 52. Accordingly, in the example shown, the original angle O is at the greatest angle relative to the rotational axis of the rotor 26, which correspond to position P1 in FIG. 5.

The cutter 34 continues to move along the cutting path P from the original angle O and original depth DO to a final angle F and final depth DF, which corresponds to a location near the inner perimeter 48, in one example. As illustrated in FIG. 4, the final angle F is at an intermediate angular position relative to the original and initial angles O, I. The final angle F can usually match the initial angle I, but can not exceed it. Referring to FIGS. 5-7, the cutting path P is shown as multiple discreet positions P1, P2, P3 . . . $P_N$ for illustrative purposes. However, it should be understood that the cutting path P is a generally continuous spiral path in the illustrated example. The angles O, F, I intersect one another at the axis T. The angle O is less than one width W from the initial angle I, measured at the ends of the initial slot 53. The angle of each position along the path P is the same as the previous angle or less relative to the initial slot 53. The cutter 34 pivots about an axis T as it moves from the original angle O to the final angle F.

The example machining process 54 is shown in FIG. 8. The blank 30 is provided, as indicated at block 56. A cutting path P is determined, as indicated at block 58, for the given blades 28 and rough contour. An initial slot 53 is provided in an area A between the adjacent blade locations 42, as indicated in block 60. A spiral cut is made in the area A to approximate the contour of the adjacent blades, as indicated at block 62. The spiral cut removes a significant amount of material, which facilitates eliminating the additional rough contouring of the adjacent blades. The contour of the blades 28 is finished using a finish machining process, as indicated at block 64, as is known.

Although an example embodiment has been disclosed, a worker of ordinary skill in this art would recognize that certain modifications would come within the scope of the claims. For that reason, the following claims should be studied to determine their true scope and content.

What is claimed is:

1. A method of manufacturing an integral bladed rotor comprising the steps of:

calculating a cutting path in an area of a blank to approximate contours of adjacent blades, the area is positioned between adjacent blade locations;

plunging the cutter into the area at an initial depth and an initial angle to provide an initial slot;

extracting the cutter from the initial slot;

plunging a cutter into the area at an original angle different than the initial angle after the extracting step; and rotating the cutter along the cutting path from the original angle as a cutting depth is increased to provide rough contours.

2. The method according to claim 1, wherein the original angle is provided near an outer perimeter of the blank.

3. The method according to claim 2, wherein the initial depth is near an inner perimeter of the blade, the adjacent blades extending from the inner perimeter.

4. The method according to claim 3, wherein the adjacent blades each include a root and a tip, the root is positioned near the inner perimeter and the tip is positioned near the outer perimeter.

5. The method according to claim 1, wherein the initial angle and the original angle intersect at an axis, the step of rotating the cutter along the cutting path corresponds to rotating the cutter about the axis.

6. The method according to claim 5, wherein the cutting path extends from the original angle to a finish angle, the finish angle different than the original and the initial angle.

7. The method according to claim 6, wherein the finish angle is arranged angularly between the, original and the initial angle.

8. The method according to claim 6, wherein the cutting path extends from an original depth to a finish depth, the finish depth approximately equal to the initial depth.

9. The method according to claim 1, wherein the cutting path is generally spiral in shape.

10. The method according to claim 9, wherein the cutting path includes an axis and the cutter follows the generally spiral shape rotating about the axis.

11. The method according to claim 1, wherein the cutter is a flat cutting disc.

12. The method according to claim 11, wherein the cutting disc is fabricated from an abrasive material.

13. The method according to claim 12, wherein the abrasive material is provided by a cubic boron nitride material.

14. The method according to claim 1, further comprising subjecting the blank to a finish machining operation subsequent to the step of rotating the cutter to provide a finished contour to the adjacent blades.

15. The method according to claim 1, wherein the adjacent blades are integrally formed with and extending from a rotor.

\* \* \* \* \*